United States Patent
Christiaens et al.

(10) Patent No.: US 7,053,156 B2
(45) Date of Patent: May 30, 2006

(54) PROCESS FOR HYDROGENATING BLOCK COPOLYMERS

(75) Inventors: Piet L. W. Christiaens, Heverlee (BE); Ronald James Hoxmeier, Houston, TX (US)

(73) Assignee: KRATON Polymers U.S. LLC, Houston, TX (US)

( * ) Notice: Subject to any disclaimer, the term of this patent is extended or adjusted under 35 U.S.C. 154(b) by 0 days.

(21) Appl. No.: 11/012,575

(22) Filed: Dec. 15, 2004

(65) Prior Publication Data

US 2005/0137353 A1    Jun. 23, 2005

Related U.S. Application Data

(60) Provisional application No. 60/531,374, filed on Dec. 19, 2003.

(51) Int. Cl.
*C08F 8/04* (2006.01)

(52) U.S. Cl. .................. 525/339; 525/332.9; 525/940; 528/482; 528/485

(58) Field of Classification Search ............... 528/482, 528/485; 525/339, 332.9, 940
See application file for complete search history.

(56) References Cited

U.S. PATENT DOCUMENTS

| | | |
|---|---|---|
| 3,113,986 A | 12/1963 | Breslow et al. |
| 3,130,237 A | 4/1964 | Wald |
| 3,202,647 A | 8/1965 | Todd et al. |
| 3,205,218 A | 9/1965 | Arbuckle et al. |
| 3,415,759 A | 12/1968 | Johnson |
| 3,595,942 A | 7/1971 | Wald et al. |
| 3,600,463 A * | 8/1971 | Hagemeyer, Jr., et al. .. 525/268 |
| 3,711,423 A | 1/1973 | Mertzweiller et al. |
| 3,758,614 A | 9/1973 | Mertzweiller et al. |
| 3,804,145 A | 4/1974 | Arnold et al. |
| 3,855,324 A | 12/1974 | Mertzweiller et al. |
| 3,932,547 A | 1/1976 | Mertzweiller et al. |
| 3,968,003 A | 7/1976 | Wolfe |
| 3,978,149 A | 8/1976 | Mertzweiller et al. |
| 4,075,251 A | 2/1978 | Mertzweiller et al. |
| 4,396,761 A | 8/1983 | Willis et al. |
| 4,629,767 A | 12/1986 | Shyr et al. |
| 5,028,665 A | 7/1991 | Hucul |
| 5,110,779 A | 5/1992 | Hucul |
| 5,220,100 A * | 6/1993 | Massie et al. ............... 585/823 |
| 5,612,422 A | 3/1997 | Hucul et al. |
| 5,654,253 A | 8/1997 | Hucul et al. |
| 5,700,878 A | 12/1997 | Hucul et al. |
| 5,789,638 A | 8/1998 | Hahn et al. |
| 6,376,622 B1 | 4/2002 | Hucul |
| 6,420,491 B1 * | 7/2002 | Wege et al. ................. 525/338 |

FOREIGN PATENT DOCUMENTS

| | | |
|---|---|---|
| EP | 0 731 111 A2 | 9/1996 |
| JP | 2002-356509 | 12/2002 |

OTHER PUBLICATIONS

Hawley's Condensed Chemical Dictionary, 14th ed, J. Wiley & Sons, 2002.*
A. Pearson, Aluminum Oxide (Alumina), Activated, in Kirk-Othmer Encyclopedia of Chemical Technology, J. Wiley & Sons, 2003; Online Posting Date: Jan. 17, 2003.*

* cited by examiner

*Primary Examiner*—Fred Teskin
(74) *Attorney, Agent, or Firm*—Donna B. Holguln

(57) ABSTRACT

Disclosed is a process for hydrogenating a block copolymer comprising admixing a block copolymer cement with hydrogen in the presence of a heterogeneous hydrogenation catalyst wherein the heterogeneous hydrogenation catalyst is a metal catalyst on a porous alumina support, the porous alumina support having the properties: (a) from about 40 to about 60 percent of the pore volume of the support have a diameter greater than 1000 nm; (b) from about 50 to about 70 percent of the pore volume of the support have a diameter greater than 100 nm; and (c) the support has a multi-modal pore structure with from about 5 to about 20 percent of the total pore volume of the porous alumina support being within a pore mode having a diameter in the range of from about 3000 nm to about 5000 nm. It is also disclosed that alumina can be used to remove a polymerization catalyst, such as Lithium, from a block copolymer cement.

13 Claims, No Drawings

PROCESS FOR HYDROGENATING BLOCK COPOLYMERS

This application claims the benefit of provisional application No. 60/531,374 filed Dec. 19, 2003.

BACKGROUND OF THE INVENTION

1. Field of the Invention

This invention relates to a process for hydrogenating block copolymers. This invention particularly relates to a process for hydrogenating block copolymers using a heterogeneous catalyst.

2. Background of the Art

Unsaturated polymers are hydrogenated for a variety of reasons, frequently using a nickel catalyst. The presence of olefinic double bonds in the polymers makes them susceptible to oxygen attack and to deterioration by actinic radiation; saturation of olefinic double bonds greatly improves environmental stability and may improve color. For example, U.S. Pat. No. 3,130,237, suggests hydrogenating unsaturated compounds by the use of certain cobalt complexes. U.S. Pat. No. 3,205,218 teaches hydrogenation of olefinic compounds utilizing a complex of a nickel or cobalt compound with certain aluminum reactants. U.S. Pat. No. 3,113,986 is related and suggests hydrogenation in the presence of the reaction products of certain metal alkoxides with aluminum trialkyls. U.S. Pat. No. 3,595,942 teaches selective hydrogenation of block copolymers with reaction products of aluminum trialkyls and metal alkoxides or carboxylates. Finally, there is a great number of references on other hydrogenation catalysts.

A common problem shared by all types of hydrogenated polymers is the deleterious effect of catalyst residues remaining after hydrogenation. The quantity of metal residues to be removed may be as high as 5% wt. Nickel, for example, discolors the product and may cause polymer deterioration. It must therefore be removed almost completely in order to prepare polymers that are color stable.

One typical method employed in the art to remove catalyst residue is by mixing a solution or emulsion of polymer, sometimes referred to as a polymer cement, with an aqueous solution of an acid, usually a mineral acid. For instance, U.S. Pat. No. 4,396,761 describes a process of removing catalyst residue by treating the polymer cement with dilute sulfuric acid, separating the aqueous phase, and contacting the polymer-containing phase with live steam to drive off the polymer solvent and convert the polymer into polymer crumb. It also describes a process wherein an alpha-hydroxysulfonic acid is used instead of the dilute sulfuric acid, and wherein the polymer crumbs so produced are then subjected to a heat treatment that removes the alpha-hydroxysulfonic acid residues.

Use of heterogeneous catalysts for hydrogenation is also known. U.S. Pat. No. 3,415,759 describes the use of heterogeneous catalysts such as nickel on supports such as kieselguhr (diatomaceous earth) and Raney nickel. U.S. Pat. No. 5,028,665, U.S. Pat. No. 5,110,779, and U.S. Pat. No. 6,376,622 describe using heterogeneous catalyst that includes a group VIII metal on a porous support.

The use of acid washes such as those described above is necessitated by the use of homogenous catalysts and heterogeneous catalysts that are too small to filter. It would be desirable in the art of preparing block copolymers to prepare the block copolymers with heterogeneous catalysts that are large enough to filter and can be used to economically prepare the block copolymers.

SUMMARY OF THE INVENTION

In one aspect the present invention is a process for hydrogenating a block copolymer cement with hydrogen in the presence of a heterogeneous hydrogenation catalyst wherein the heterogeneous hydrogenation catalyst is a nickel catalyst on an porous alumina support, the porous alumina support having the properties:
(a) from about 40 to about 60 percent of the pores of the support have a diameter greater than 1000 nm;
(b) from about 50 to about 70 percent of the pores of the support have a diameter greater than 100 nm; and
(c) the support has a multi-modal pore structure with from about 5 to about 20 percent of the total pore volume of the porous alumina support being within a pore mode having a diameter in the range of from about 3000 nm to about 5000 nm.

In another aspect, the present invention is a process for removing polymerization catalyst from a block copolymer cement comprising contacting the block copolymer cement with alumina for a time and under conditions sufficient to adsorb the polymerization catalyst and then separating the alumina from the polymer cement.

DETAILED DESCRIPTION OF THE PREFERRED EMBODIMENTS

In one aspect, the present invention is a process for hydrogenating a block copolymer. In the practice of the present invention, the block copolymer is a conjugated diene polymer. In a typical synthetic process for preparing a conjugated diene block copolymer, an initiator compound, often a lithium alkyl, is used to start the polymerization of one monomer. The reaction is allowed to proceed until all of the monomer is consumed resulting in a living homopolymer. To this living homopolymer is added a second monomer that is chemically different from the first. The living end of the first polymer serves as the site for continued polymerization, thereby incorporating the second monomer as a distinct block into the linear polymer. The block polymer so grown is living until terminated.

Butadiene and styrene are often used to prepare such polymers. The most common of these are styrene and butadiene diblock copolymers and triblock copolymers having a butadiene midblock with styrene endblocks. In some instances, coupling agents can also be used to couple still living polymers to prepare higher molecular weight polymers. In the production of the most common triblock copolymers, after the butadiene midblock is prepared, additional styrene is then added to the molecule to form a styrene endblock. These polymers are often referred to as SBS copolymers. Isoprene is also a commonly used monomer. These block copolymers exhibit thermoplastic and elastomeric properties.

In one embodiment of the present invention, block copolymers are prepared by anionic polymerization and then hydrogenated in the solution or suspension in which they are polymerized. The solution or suspension is, for the purposes of the present invention, a polymer cement. The polymer cement therefore contains the metal ions used in the anionic polymerization, which is frequently at high concentrations.

Hydrogenation catalysts useful in the present invention can be prepared using nickel (Ni). For example, in one embodiment of the present invention, the porous support is impregnated with nickel by dissolving nickel acetate tetrahydrate in methanol and then soaking the support in the solution. The support can be dried under vacuum and then washed with a solvent such as cyclohexane. The support can then be crushed to prepare a powder of the desired consistency. Any method of impregnating the catalyst upon the support known to those of ordinary skill in the art of preparing such catalysts to be useful can be used with the method of the present invention.

The supports for the catalysts useful with the present invention are porous alumina supports wherein from about 40 to about 60 percent of the pores of the support have a diameter greater than 1000 nm. From about 50 to about 70 percent of the pores of the support have a diameter greater than 100 nm. The supports useful with the method of the present invention have a multi-modal pore structure with from about 5 to about 20 percent of the total pore volume of the porous alumina support being within a pore mode having a diameter in the range of from about 3000 nm to about 5000 nm. Any support having these properties can be used with the method of the present invention.

Nickel is a preferred catalyst for use with the present invention, but other metals can also be used. For example, Palladium and Cobalt can also be used with the method of the present invention.

The hydrogenation may be carried out with a hydrogen partial pressure of between 0.1 and 10 MPa. More typically, the hydrogen partial pressure is between 0.7 and 8.3 MPa. The amount of hydrogenation catalyst may vary from 0.5 to 50 grams per kg polymer. The heterogeneous catalysts can be admixed with the cement, formed in a bed, or some combination of these. Hydrogenation can be carried out at temperatures of between 25° C. and 150° C. The time of hydrogenation under such conditions will typically be between 0.1 and 4 hours, achieving greater than 90 percent hydrogenation of the initial olefinic unsaturation. It is generally undesirable to hydrogenate aromatic unsaturation.

The hydrogenated polymer is typically stabilized by the addition of an antioxidant or mixture of antioxidants. Frequently, a phosphorus-based stabilizer is used in combination with a sterically hindered phenolic stabilizer, such as disclosed in Japanese patent No. 94055772; or a combination of phenolic stabilizers is used, such as disclosed in Japanese patent No. 94078376.

Finally, the hydrogenated polymer may be isolated and recovered by a variety of techniques. The polymer may be isolated in the form of crumbs, using the technology disclosed in U.S. Pat. No. 3,202,647 or disclosed in EP Patent Appl. No. 731,111; by use of a cyclone separator as disclosed in U.S. Pat. No. 3,804,145 and U.S. Pat. No. 3,968,003; or by use of a devolatilizing extruder (vented extruder) as is disclosed for instance in Japanese Patent No. 91049281.

Use of the heterogeneous catalysts of the present invention allows for easy removal of the hydrogenation catalysts. This is an advantage over conventional processes as described in the background which often require washing with acid and the like. Surprisingly, use of the heterogeneous catalysts of the present invention also allows for the easy removal of the polymerization catalysts. While not wishing to be bound to any theory, it appears that the alumina support can extract catalysts such as lithium (Li) from the polymer cement. In one embodiment of the present invention, the catalyst of the present invention also serves as a means for removing Li from the polymer cement. In another embodiment, an alumina support that has not been impregnated with the metal catalyst is used to extract Li from the polymer cement, preferably as a bed of support materials through which the polymer cement is passed. In this embodiment of the present invention, pore size and volume is less important and essentially any porous alumina support can be used to remove Li.

While the process of the present invention can be used with any block copolymer, it will work better with copolymers having molecular weights that are within a range to allow for easy migration in and out of the support pores. Again, while not wishing to be bound to any theory, it is believed that the bimodal or multimodal porosity of the catalysts of the present invention function in two ways. The large pores may serve as a site for the actual hydrogenation while the smaller pores function as a hydrogen sink.

In the practice of the present invention, alumina, particularly alumina in the form of a catalyst support is removed from a block copolymer cement. This separation can be performed using any method known to be useful to those of ordinary skill in the art of making such separations. Examples of such separations include, but are not limited to, filtering and centrifugation.

EXAMPLES AND COMPARATIVE EXAMPLES

The following examples are provided to illustrate the present invention. The examples are not intended to limit the scope of the present invention and they should not be so interpreted. Amounts are in weight parts or weight percentages unless otherwise indicated.

Example 1

A catalyst is prepared by impregnating a support with a Nickel catalyst. The support has a total pore volume of 0.55 $cm^3Hg/g$; total surface area of 17.3 $m^2/g$ determined using the Nitrogen Brunauer, Emmett, and Telder (BET) method; 97.6 percent of the pore volume is within pores having a diameter of >10 nm; 70.2 percent of the pore volume is within pores having a diameter of >100 nm; and 47.7 percent of the pore volume is within pores having a diameter of >1000 nm.

A 2% Ni on alumina catalyst is prepared using the following steps:

Dry the alumina cylinders over night at 120° C.

Prepare a solution of 18.85 g $Ni(OAc)_2.4H_2O$ in 100 ml methanol: 4% Ni in methanol.

Take 100 g of dried $Al_2O_3$ cylinders and impregnate them with the 4% Ni solution.

Dry the impregnated pellets over night at 120° C. under vacuum.

Reduce with 37.5 ml of a 1M triethylaluminum in cyclohexane. Make sure that all cylinders are reduced equally.

Dry the reduced pellets over night at 120° C. under vacuum.

Wash the catalyst with cyclohexane until the wash contains no nickel as indicated by a colorless wash.

The catalyst is crushed with pestle and mortar to a powder and suspended in 150 g of cyclohexane before addition to the reactor.

A polymer cement for a lithium initiated anionically polymerized styrene-butadiene-styrene block copolymer having a molecular weight of about 50,000 Daltons, and 30% PSC (polystyrene content), is hydrogenated. The hydrogenation is carried out in a 1 L autoclave reactor. The cement used has a 20% solids concentration, however, since the catalyst is a suspension in cyclohexane, the hydrogenation is done with an actual cement concentration at 15% solids.

The experimental conditions were:
Hydrogen pressure: 1000 psig (6.9 MPa)
Stirrer speed: 2000 rpm
Amount of slurry catalyst: 15-g dry weight suspended in 150 g of cyclohexane
Amount of cement: 350 g Determination of saturation, residual saturation, percent conversions and percent styrene are made using proton NMR.

Results are displayed below in Table 1.

Example 2

The method of Example 1 is repeated substantially identically except that the pressure is varied as shown in Table 2.

Example 3

35 grams of the 20 percent solids cement used in Example 1 is admixed with support material, shaken for 30 minutes, and the resulting admixture is centrifuged. The resulting polymer is dried and tested for Lithium concentration. The results are shown below in Table 3.

Comments Regarding the Examples

Example 1 shows that a heterogeneous Ni catalyst can be used to hydrogenate aliphatic unsaturation in S-B-S block copolymers without significant degradation of the styrene blocks under normal hydrogenation conditions.

Example 2 shows that the method of the present invention can be used at a range of pressures and is substantially independent of pressure over a range of from about 400 psig (2.8 MPa) to about 1400 psig (9.6 MPa).

Example 3 shows that the method of the present invention can be used to remove Lithium from polymer cements.

TABLE 1

| Example Number | Hydrogenation Temperature °C. | Time Minutes | Percent Conversion | Remaining Unsaturation meq/g | Percent Styrene |
|---|---|---|---|---|---|
| 1-A | 90 | 60 | 64.4 | 4.69 | 27 |
|  | 90 | 120 |  |  |  |
|  | 90 | 180 | 93.9 | 0.79 | 26.69 |
|  | 90 | 240 | 95 | 0.66 | 26.6 |
|  | 90 | 300 | 96.6 | 0.45 | 26.51 |
| 1-B | 50 | 60 | 20.7 | 10.55 | 27.5 |
|  | 50 | 120 | 42.4 | 7.62 | 27.34 |
|  | 50 | 180 | 57.2 | 5.65 | 27.08 |
|  | 50 | 240 | 72.5 | 3.61 | 26.92 |
|  | 50 | 300 | 82.2 | 2.33 |  |
| 1-C | 150 | 60 | 86.2 | 1.83 | 26.27 |
|  | 150 | 120 | 97.7 | 0.31 | 24.72 |
|  | 150 | 180 | 99.1 | 0.12 | 23.38 |
|  | 150 | 240 | 99.4 | 0.08 | 21.55 |
|  | 150 | 300 | 99.5 | 0.07 | 19.56 |

TABLE 2

| Example Number & Pressure | Hydrogenation Temperature °C. | Time Minutes | Percent Conversion | Remaining Unsaturation meq/g | Percent Styrene |
|---|---|---|---|---|---|
| 2-A 1000 psig (6.9 MPa) | 90 | 60 | 64.4 | 4.69 | 27 |
|  | 90 | 120 |  |  |  |
|  | 90 | 180 | 93.9 | 0.79 | 26.69 |
|  | 90 | 240 | 95 | 0.66 | 26.6 |
|  | 90 | 300 | 96.6 | 0.45 | 26.51 |
| 2-B 1400 psig (9.6 MPa) | 90 | 60 |  |  |  |
|  | 90 | 120 |  |  |  |
|  | 90 | 180 | 88.5 | 1.51 | 26.72 |
|  | 90 | 240 | 93.4 | 0.87 | 26.58 |
|  | 90 | 300 | 95.1 | 0.65 | 26.53 |
| 2-C 400 psig (2.8 MPa) | 90 | 60 | 68.1 | 4.18 | 27.18 |
|  | 90 | 120 | 79.9 | 2.64 | 27.02 |
|  | 90 | 180 | 91.8 | 1.07 | 26.7 |
|  | 90 | 240 | 95 | 0.65 | 26.53 |
|  | 90 | 300 | 96.2 | 0.49 | 26.54 |
|  | 90 | 360 | 96.3 | 0.49 | 26.39 |
|  | 90 | 420 | 97.8 | 0.29 | 26.45 |

TABLE 3

| Sample No. | Grams of Support | Residual [Li] ppm |
|---|---|---|
| 3-A | 1 | 2.1 |
| 3-B | 2 | 1.0 |
| 3-C | 3 | 0.1 |
| Blank | 0 | 150 |

What is claimed is:

1. A process for hydrogenating a block copolymer comprising admixing a block copolymer cement comprising an unhydrogenated block copolymer in the solution or suspension in which the copolymer is prepared with hydrogen in the presence of a heterogeneous hydrogenation catalyst wherein the heterogeneous hydrogenation catalyst is a metal catalyst on a porous alumina support, the porous alumina support having the properties:
    (a) from 40 to 60 percent of the pore volume of the support have a diameter greater than 1000 nm;
    (b) from 50 to 70 percent of the pore volume of the support have a diameter greater than 100 nm; and
    (c) the support has a multi-modal pore structure with from 5 to 20 percent of the total pore volume of the porous alumina support being within a pore mode having a diameter in the range of from 3000 nm to 5000 nm.

2. The process of claim 1 wherein the unhydrogenated block copolymer is prepared by anionic polymerization of a diene and a vinyl aromatic monomer.

3. The process of claim 2 wherein the diene is butadiene or isoprene.

4. The process of claim 3 wherein the vinyl aromatic monomer is styrene.

5. The process of claim 4 wherein the diene is butadiene.

6. The process of claim 1 wherein the metal is selected from Nickel, Palladium, and Cobalt.

7. The process of claim 6 wherein the metal is Nickel.

8. The process of claim 1 wherein the hydrogenation is carried out with a hydrogen partial pressure of from 0.1 to 10 MPa and at temperatures of from 25° C. to 150° C.

9. The process of claim 8 wherein the temperature is about 90° C.

10. The process of claim 1 wherein the hydrogenated polymer is stabilized by the addition of an antioxidant or mixture of antioxidants.

11. A process for removing polymerization catalyst from a block copolymer cement comprising contacting the block copolymer cement with a catalyst support comprising alumina for a time and under conditions sufficient to adsorb the polymerization catalyst and then separating the alumina from the polymer cement, wherein the catalyst support is a porous alumina support, the porous alumina support having the properties:
(a) from 40 to 60 percent of the pore volume of the support having a diameter greater than 1000 nm;
(b) from 50 to 70 percent of the pore volume of the support having a diameter greater than 100 nm; and
(c) the support has a multi-modal pore structure with from 5 to 20 percent of the total pore volume of the porous alumina support being within a pore mode having a diameter in the range of from 3000 to 5000 nm.

12. The process of claim 11 wherein the alumina is present at a concentration of 1 gram of alumina per 150 ppm catalyst.

13. The process of claim 11 wherein the polymerization catalyst is Lithium.

* * * * *